(12) United States Patent
Lueck

(10) Patent No.: US 8,117,531 B1
(45) Date of Patent: Feb. 14, 2012

(54) INTERPRETED LANGUAGE TRANSLATION SYSTEM AND METHOD

(75) Inventor: Michael F. Lueck, Kitchener (CA)

(73) Assignee: Google Inc., Mountain View, CA (US)

( * ) Notice: Subject to any disclaimer, the term of this patent is extended or adjusted under 35 U.S.C. 154(b) by 993 days.

(21) Appl. No.: 11/233,722

(22) Filed: Sep. 23, 2005

(51) Int. Cl.
*G06F 17/00* (2006.01)

(52) U.S. Cl. .......................... 715/204; 709/219; 719/328

(58) Field of Classification Search .................. 715/204, 715/234–235, 272–273
See application file for complete search history.

(56) References Cited

U.S. PATENT DOCUMENTS

| | | | |
|---|---|---|---|
| 5,530,852 A | 6/1996 | Meske, Jr. et al. | 395/600 |
| 5,802,367 A | 9/1998 | Held et al. | 395/685 |
| 5,918,013 A | 6/1999 | Mighdoll et al. | 395/200.47 |
| 5,987,256 A | 11/1999 | Wu et al. | 395/707 |
| 5,996,022 A | 11/1999 | Krueger et al. | 709/247 |
| 6,247,048 B1 | 6/2001 | Greer et al. | 709/219 |
| 6,311,215 B1 | 10/2001 | Bakshi et al. | 709/221 |
| 6,345,300 B1 | 2/2002 | Bakshi et al. | 709/229 |
| 6,401,132 B1 | 6/2002 | Bellwood et al. | 709/246 |
| 6,421,733 B1 | 7/2002 | Tso et al. | 709/246 |
| 6,535,896 B2 | 3/2003 | Britton et al. | 707/523 |
| 6,611,358 B1 | 8/2003 | Narayanaswamy | 358/442 |
| 6,763,460 B1 | 7/2004 | Hild et al. | 713/161 |
| 6,772,200 B1 | 8/2004 | Bakshi et al. | 709/217 |
| 6,829,746 B1 | 12/2004 | Schwerdtfeger et al. | 715/523 |
| 6,842,771 B2 | 1/2005 | Lansio et al. | 709/203 |
| 6,857,102 B1 * | 2/2005 | Bickmore et al. | 715/205 |
| 6,880,014 B2 | 4/2005 | Brown et al. | 709/227 |
| 7,072,984 B1 * | 7/2006 | Polonsky et al. | 709/246 |
| 2007/0288855 A1 * | 12/2007 | Rohrabaugh et al. | 715/760 |
| 2008/0005064 A1 * | 1/2008 | Sarukkai | 707/3 |
| 2008/0109477 A1 * | 5/2008 | Lue | 707/102 |

FOREIGN PATENT DOCUMENTS

EP 1 126 380 A1 8/2001

OTHER PUBLICATIONS

Pham et al. "Handheld Devices for Application Using Dynamic Multimedia Data" -Published 2004 by ACM pp. 123-130.*
Intelligent Mobile Platform™, downloaded from http://www.infogin.com/imp.html , downloaded on Sep. 23, 2005 (2 pages).
Overview, downloaded from http://www.ingogin.com/products.html, on Sep. 23, 2005 (2 pages).

* cited by examiner

*Primary Examiner* — Quoc A Tran
(74) *Attorney, Agent, or Firm* — Fish & Richardson P.C.

(57) ABSTRACT

A computer-implemented method of processing an interpreted language element for execution on a mobile communication device including receiving at a server system a request from a remote device for a first electronic document that includes an interpreted language element, executing the interpreted language element using an interpreter, creating a context for the interpreted language element, generating a second electronic document based on a result of the execution, and transmitting the second electronic document to the remote device for display. In one implementation, executing the interpreted language element may include performing an action specified by the interpreted language element. In another implementation, the executing may include embedding the interpreted language element in a markup link that contains an address corresponding to the server system.

27 Claims, 9 Drawing Sheets

INTERPRETED LANGUAGE TRANSLATION SYSTEM AND METHOD

TECHNICAL FIELD

This application relates to an interpreted language translation system and method.

BACKGROUND

As computers and computer networks become more and more able to access a variety of dynamic web-based content, people are demanding more ways to obtain that content. Specifically, people now expect to have access, on the road, in the home, or in the office, to dynamic content previously available only from a permanently-connected personal computer hooked to an appropriately provisioned network. They want to view web pages with dynamically loaded navigation menus from their cell phones, track purchases in an online shopping cart from their personal digital assistants (PDAs), and validate entered information in online forms from their palm tops. They also want all of this dynamic content when traveling, whether locally, domestically, or internationally, in an easy-to-use, portable device.

Portability generally requires a device small in size, which in turn limits the space available for memory and processing elements. This limitation may prevent portable devices from executing dynamic content because the devices lack the necessary memory and processing requirements.

Many web pages may include dynamic content that will not display correctly on portable devices. This may significantly reduce the type and number of web pages a portable device user may view. For example, if a web page is requested that contains dynamically generated content, the user will not be able to view this content and may receive an error message associated with the entire web page. The user may be frustrated or confused if portions or the entire web page does not display correctly.

SUMMARY

This document discloses methods and systems for processing an interpreted language for execution by a wireless device.

In accordance with one aspect, a computer-implemented method of processing an interpreted language element for execution on a mobile communication device is disclosed. The method includes receiving at a server system a request from a remote device for a first electronic document that comprises an interpreted language element, executing the interpreted language element using an interpreter, creating a context for the interpreted language element, generating a second electronic document based on a result of the execution, and transmitting the second electronic document to the remote device for display.

In one implementation, the executing includes performing an action specified by the interpreted language element. Alternatively, the executing may comprises embedding the interpreted language element in a markup link that contains an address corresponding to the server system. The method may include receiving a second request to execute an action specified by the interpreted language element, where the second request is generated by a client executing the markup link. The method may also include generating and transmitting a third document based on results of the execution of the action specified by the interpreted language element. The context may include document elements from the first electronic document and may be used in the execution of the action specified by the interpreted language element. Additionally, the static language element may include a unique identifier. The method may disambiguate, with the unique identifier, which static language element generated the second request.

Also, generating the second electronic document may include modifying the first electronic document by replacing the interpreted language element with a static language element. The static language element may include the interpreted language element and an address corresponding to the server system.

In another implementation, the document comprises more than one frame. The requested document may also be retrieved from a remote web server. The selecting may include parsing contents of the electronic document into a document object model tree and traversing the tree to locate the interpreted language element. The context may include document objects that form nodes of the document object model tree. A second interpreted language element may be transmitted in the second electronic document for execution on a client. Also, a request may be received from the client to execute a portion of the second interpreted language element.

In yet another implementation, the interpreted language element may be selected from a group consisting of a JavaScript element, a Visual Basic Script element, a Perl element, and a Tool Command Language element. The static language element may be selected from a group consisting of a Hyper Text Markup Language element, an Extensible Markup Language element, and a Wireless Markup Language element. Additionally, the second electronic document may be stored in a database and transmitted in response to future requests for the first electronic document. The executing may occur after the request is received from the remote device.

In accordance with another aspect, a computer-implemented system for processing an interpreted language element for execution on a mobile communication device is disclosed. The system includes a parser to select an interpreted language element from a first electronic document, means for executing the interpreted language element and for generating a second electronic document based on results associated with the executed interpreted language element, and an interface to transmit the second electronic document to a remote device.

In accordance with still another aspect, a translation system is disclosed. The translation system includes a parser to organize elements in a first electronic document and to select an interpreted language element from the organized elements, an interpreter to execute the selected interpreted language element and to output a static language element executable on a remote device, a context repository containing at least a portion of the organized elements in a format accessible by the interpreter, and a document generator to produce a second electronic document comprising the static language element.

The systems and techniques described here may provide one or more of the following advantages. A system may provide access to dynamic content, and may permit viewing of an interpreted language element without the need for an interpreter on the viewing device. Also, a system may enable a user to interact with a variety of content even if the user's device can not execute or interpret that content. Such a system may permit efficient partial execution of interpreted language elements at a remote device, while still permitting additional execution of the elements at a server system. Additionally, the system can be implemented on portable systems, such as cellular telephones, having limited resources, such as memory and processing power.

The details of one or more implementations are set forth in the accompanying drawings and the description below. Other features, objects, and advantages will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

Figure 1:
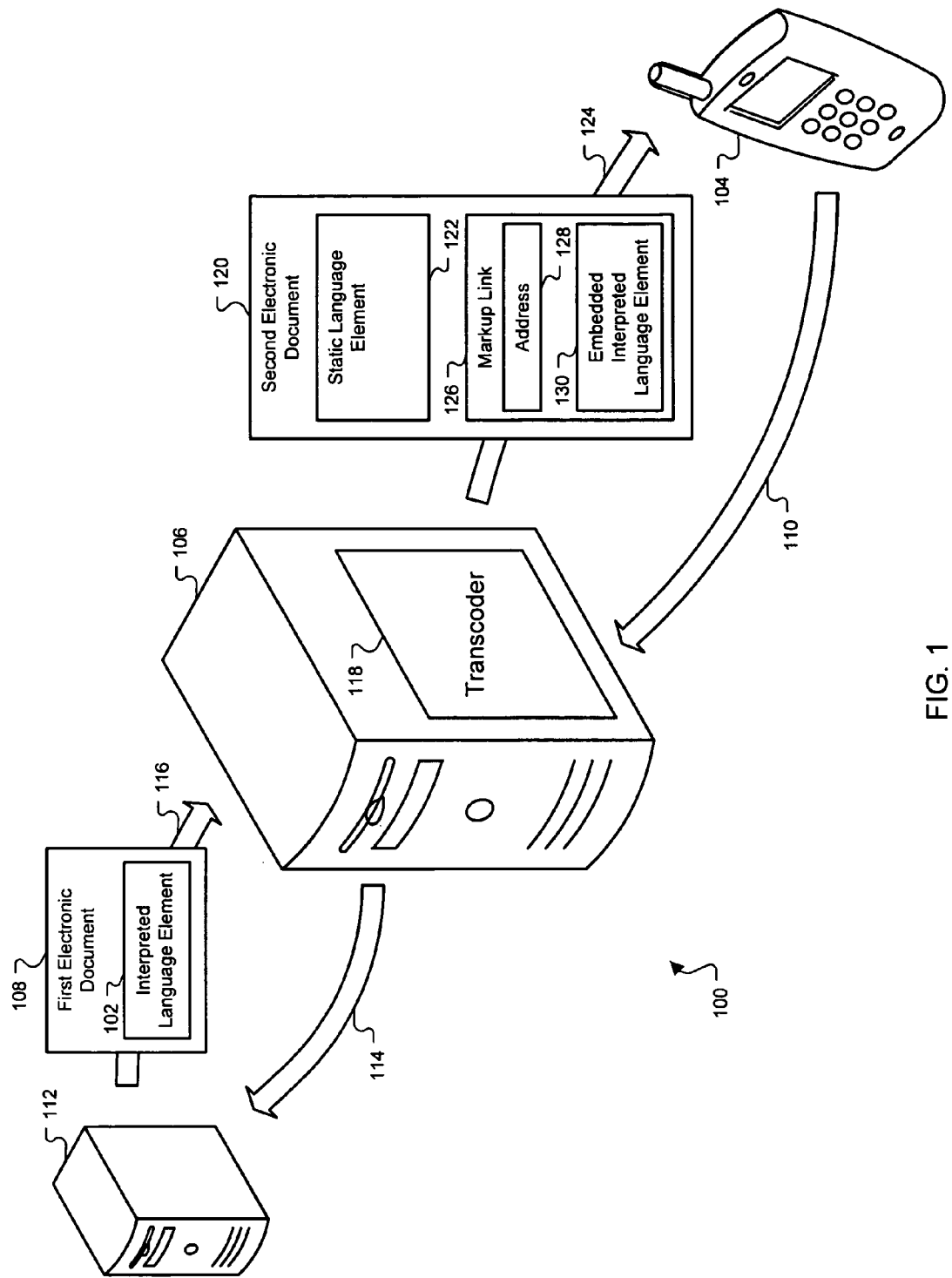
FIG. 1 is a schematic diagram of a system for processing an interpreted language element (ILE) for execution on a mobile communication device according to one implementation.

FIG. 1 is a schematic diagram of a system 100 for processing an interpreted language element (ILE) 102 for execution on a mobile communication device 104 according to one implementation. The mobile communication device, hereafter referred to as the remote device 104, may send a request to a server system 106 for a first electronic document 108 containing the ILE 102, as represented by the arrow 110. In some implementations, the server system 106 forwards the request for the first document 108 to a remote web server 112, as represented by the arrow 114, and the remote web server 112 sends the first document 108 to the server system 106, as represented by the arrow 116.

For example, a user of the remote device 104 may view a list of web page links retrieved from a web search performed by the server system 106. The list may include a web page link specifying a web page at the remote web server 112 such as:

http://www.remotewebserver.com/first_document.html.

The server system 106 may modify the actual Uniform Resource Locator (URL) accessed when the user selects the web link above so that the link is first directed to the server system 106, such as in the following URL:

http://www.google.com/?u=www.remotewebserver.com/first_document.html.

Here, "www.google.com" is the network address of the server system 106. The "?u=www.remotewebserver.com/first_document.html" parameter in the URL directs the server system 106 to request from the remote web server 112 the first document 108 located at "www.remotewebserver.com/first_document.html."

The server system 106 may include a transcoder 118 for processing the ILE 102 contained in the first document 108. The transcoder 118 may create a context in which the ILE 102 may execute. For example, the first document 108 may be a web page containing a web form and the context may include information, such as the structure of the web page and data that a user has entered in the web form.

The ILE 102 may contain one or more markup language tags that define the ILE 102. For example, HTML uses the "<script>" tag to identify interpreted language elements, such as a JavaScript element and a Visual Basic Script element. The ILE 102 may include other language elements, such as a Perl. For example, the HTML tag <img src=cgi-bin/img_counter.pl> includes a Perl script called "img_counter.pl" and is located in a directory called "cgi-bin." The <script> tag may contain attributes, such as a "type" attribute specifying the type of script language used and a "src" attribute indicating an external document that contains the script to be executed. For example, the HTML tag <script type='text/tcl' src='http://www.google.com/formcheck.tcl'> specifies the Tcl scripting language is used and the Tcl file to be executed is located at "www.google.com."

The transcoder 118 may execute the ILE 102 using the context. For example, the ILE 102 may rely on information in the context, such as the data entered by the user or the structure of the web page, in order to execute. The execution of the ILE 102 may include performing actions specified by the ILE 102 that modify the context, such as by generating or modifying web page elements or changing data within a web page element. The actions may include animating an image, processing a form, validating data entry, restricting data entry, and navigating within or outside of the web page. For example, the ILE 102 may create a web element, such as in the script "document.write(<p>Hello World!</p>)," or the ILE 102 may set an available <option> tag in a <select> tag, such as in the script "document.form_name.select_name.options[0]=New Option('Apple')," where form name corresponds to the name attribute of a <form> element and select_name corresponds to the name attribute of a <select> element. The transcoder 118 may execute the ILE 102 after receiving the request for the first document 108 from the remote device 104. Alternatively, the transcoder 118 may execute the ILE 102 in the first document 108 before receiving a request for the first document 108 from the remote device 104. For example, the server system 106 may store frequently requested documents and process them prior to requests from the remote device 104.

The transcoder 118 may use the results of the ILE execution to generate a second electronic document 120. The second document 120 may be based on changes made to the context by the ILE 102. The second document 120 may include a static language element 122, such as an element created by a JavaScript "document.write( )" function call in the ILE 102. The second document 120 and the static language element 122 may be in a web accessible format, such as HTML, Extensible Markup Language (XML), and Wireless Markup Language (WML).

As shown FIG. 1, the server system 106 transmits the second document 120 to the remote device 104, as represented by the arrow 124. The remote device 104 may then display the second document 120 to the user.

In some implementations, the transcoder 118 may not completely execute the ILE 102 due to a portion of the ILE 102 being dependent on actions performed by the user at the remote device 104. If a portion of the ILE 102 relies on an interaction the user makes in the second document 120, the second document 120 may include the static language element 122 that is associated with the ILE 102 or a portion of the ILE 102. In one implementation, the static language element 122 is a markup link 126. The markup link 126 is capable of communicating the user interaction back to the server system 106, so that the portion of the ILE 102 relying on the user interaction may execute. The markup link 126 may include an address 128 of the server system 106. If the user selects the markup link 126, the address 128 directs the results of the selection to the server system 106. The markup link 126 may also include an embedded ILE 130. The server system 106 may store in the second document 120 a portion of the ILE 102 in the embedded ILE 130. If the user selects the markup link 126, including the embedded ILE 130, the server system 106 may execute the embedded ILE 130 upon receiving the request from the selection of the markup link 126.

For example, a document may contain two <select> tags. The <option> tags in the second <select> tag may be based on which <option> is selected in the first <select> tag. The ILE 102 may perform the actions of setting the available options in the second <select> tag as shown above. In order to communicate the selection of an option in the first <select> tag, the <option> tag in the first <select> tag may be replaced with the markup link 126.

Figure 2:
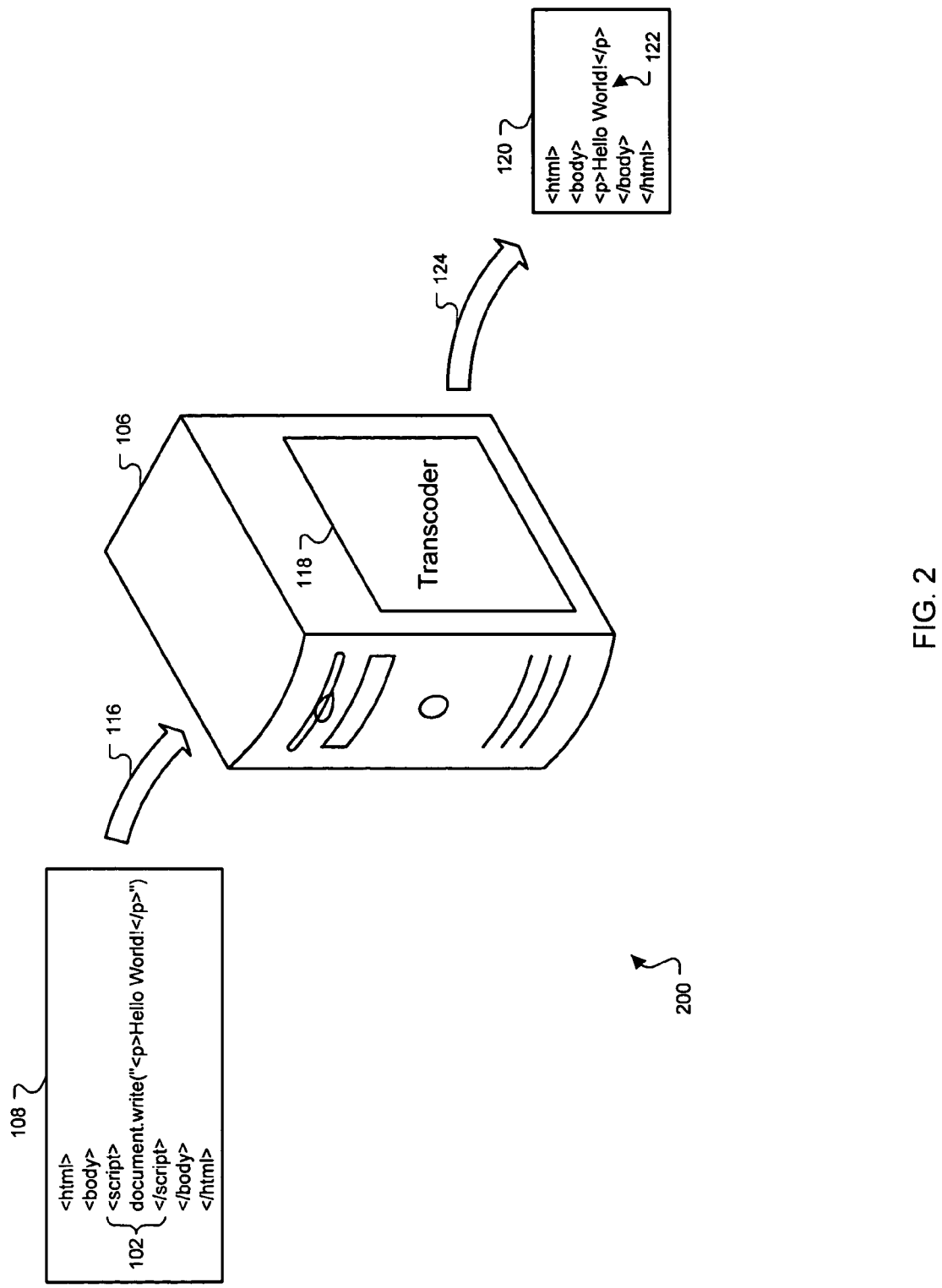
FIG. 2 is a schematic diagram of a document showing hypertext markup language (HTML) code before and after processing by the system of FIG. 1 according to one implementation.

FIG. 2 is a schematic diagram 200 of a document showing hypertext markup language (HTML) code before and after processing by the system of FIG. 1 according to one implementation. Here, the first document 108 includes the ILE 102, which is specified by an HTML <script> tag. The content of the <script> tag calls a JavaScript function, "doctument. write( )" which generates the text, "Hello World!" on a web page. The server system 106 receives the first document 108. The transcoder 118 creates the context for the first document 108 and executes the ILE 102 using the context. The transcoder 118 uses the results of executing the ILE 102 to generate the second document 120. The second document 120 includes the static language element 122 generated from the ILE 102. Here, the static language element 122 includes a paragraph (<p>) tag containing the text, "Hello World!" that the ILE 102 generates. The server system 106 then transmits the second document 120 to the remote device 104.

Figure 3:
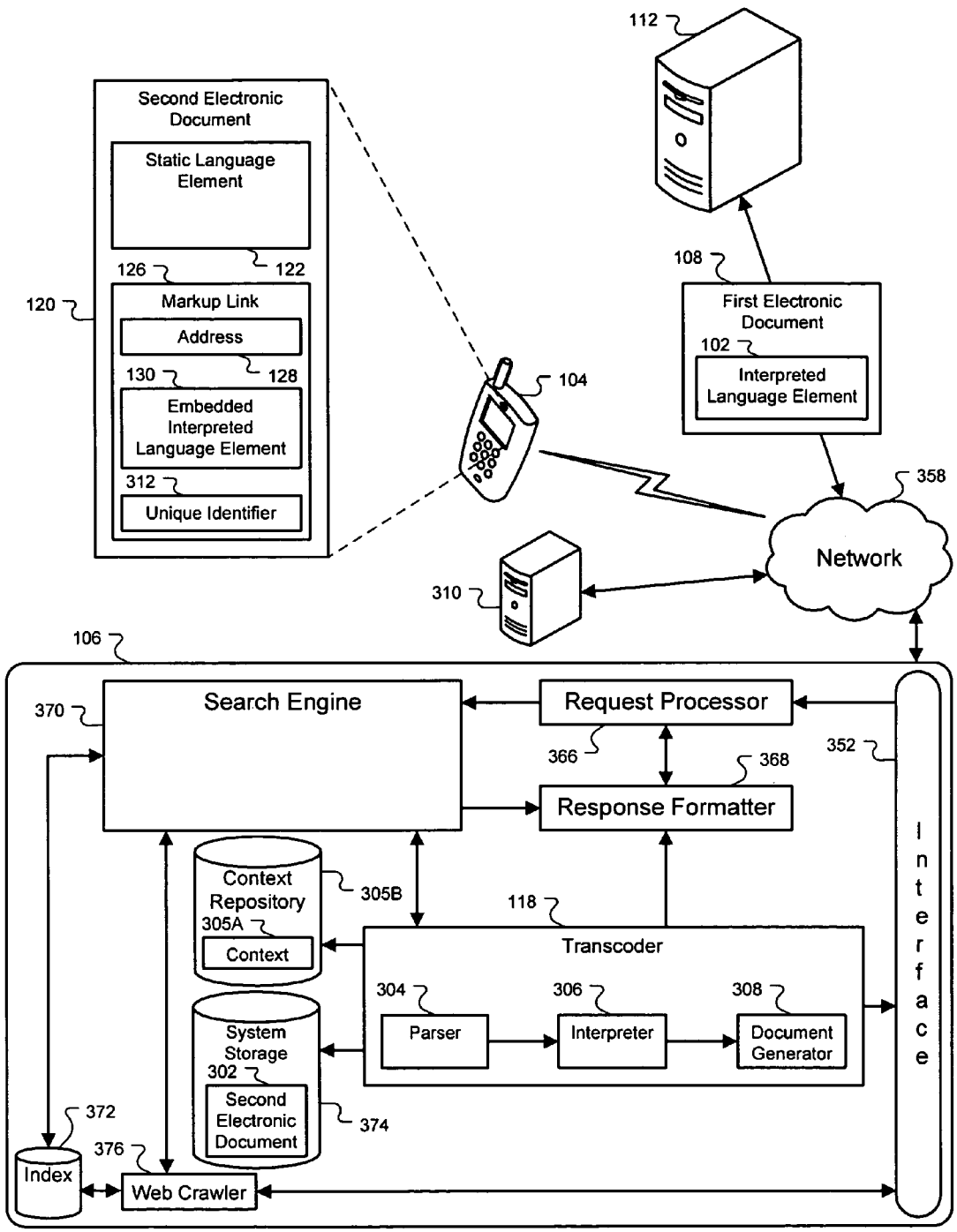
FIG. 3 is a block diagram of the system of FIG. 1 showing more detail according to one implementation.

FIG. 3 is a block diagram of the system 100 of FIG. 1 showing more detail according to one implementation. FIG. 3 shows the server system 106 and devices in communication with it. The server system 106 may be implemented, for example, as part of an Internet search provider's general system.

The server system 106 is provided with an interface 352 to allow communications with a network 358, such as the Internet. The server system 106 may communicate with various devices, such as the remote device 104 and the remote web server 112. The communication flow for any device may be bidirectional so that the server system 106 may receive information, such as commands, from the devices, and may also send information to the devices.

Commands and requests received from devices may be provided to a request processor 366, which may interpret a request, associate it with predefined acceptable requests, and pass it on, such as in the form of a command to another component of the server system 106 to perform a particular action. For example, in an implementation where the server system 106 is part of the Internet search provider's general system, the request may include a search request. The request processor 366 may cause a search engine 370 to generate search results corresponding to the search request. The search engine 370 may use data retrieval and search techniques like those used by the Google PageRank™ system. The results generated by the search engine 370 may then be provided back to the original requester using a response formatter 368, which carries out necessary formatting on the results.

The search engine 370 may rely on a number of other components for its proper operation. For example, the search engine 370 may refer to an index 372 of web sites instead of searching the web sites themselves each time a request is made, so as to make the searching much more efficient. The index 372 may be populated using information collected and formatted by a web crawler 376, which may continuously scan potential information sources for changing information.

The transcoder 118 may access a system storage 374. The system storage 374 may be one or more storage locations for files needed to operate the system, such as applications, maintenance routines, and management and reporting software. In some implementations, the transcoder 118 may store the second document 120 in the system storage 374. The server system 106 may transmit the stored second electronic document 302 in response to future requests for the first document 108.

The transcoder 118 may include several components used to process the first document 108 and the ILE 102. A parser 304 may select the ILE 102 from the first document 108. The parser 304 may decode the entire first document 108 using an application programming interface (API) to access the content of the first document 108. For example, if the first document 108 is a web page, the parser 302 may access the elements, or document objects, of the web page using a document object model (DOM) API. Using the DOM API, the parser 304 may load the document objects from the first document 108 into memory using a data structure, such as a tree. The DOM may allow the document objects to be accessed randomly, or in an order different from the order in which they are specified in the first document 108. Alternatively, the parser 304 may input the first document 108 as a series of characters or character strings. The characters or strings may be serially compared with a set of predefined identifiers that specify the existence of an ILE, such as the "<script>" tag in the case of HTML. The DOM may form a context 305A in which the server system 106 will execute the ILE 102. In another implementation, the parser 304 may create the context 305A separate from any DOM created. The context 305A may be stored in a context repository 305B.

In some implementations, the parser 304 or the transcoder 118 may determine whether to process the first document 108. For example, the transcoder 118 may contain a list of web sites that have contracted the server system 106 to process their web pages. The parser 304 may choose to process only those web pages that belong to web sites included in the list. In another implementation, the transcoder 118 may only process a portion of the first document 108. For example, the first document 108 may be a web site www.website.com. The web site may contain advertising content generated by JavaScript, where the first advertiser is cheapcars.com and the second advertiser is expensivecars.com. Expensivecars.com may pay a fee to have its advertisements processed by the transcoder 118. An identifier associated with expensivecars.com may be recorded in an index that is accessed to determine whether a particular ILE should be processed. The transcoder 118 may parse the ILE 102 to determine if it contains an identifier that matches an identifier in the index. If a match is found, the ILE 102 may be processed. Here, the identifier may be expensivecars.com. The transcoder 118 may examine the ILE 102 and determine that it retrieves content from expensivecars.com's web server. The ILE 102 is executed, because expensivcars.com is included in the index. The ILE 102 that retrieves content from the cheapcars.com web site, however, would not be processed because no matching entry is present in the index.

The transcoder 118 may include an interpreter 306 capable of executing the ILE 102. The interpreter 306 may select from several different engines, which may be specific to the language used in the ILE 102. The ILE 102 may contain an element, such as the "type" attribute in HTML, that specifies the language used in the ILE 102. The interpreter 306 utilizes the context, which represents the state of the document. In one implementation, the context includes the elements of a web page and data entered in fields on the web page in the form of a DOM tree. The interpreter 306 executes the ILE 102, which may perform actions that modify the context, such as creating or modifying an element in the web page or modifying data in the web page.

The transcoder 118 may also include a document generator 308. In one implementation, the document generator 308 creates the second document 120 using the context, modified by the interpreter 306, and content from the first document 108. Additionally, the document generator 308 may modify hyperlinks to other web pages in the second document 120 so that they are first directed to the server system 106 for processing. For example, an element within the first document 108 may have an associated HTML attribute specifying a hyperlink to another web page. The web page may be located at a second remote web server 310. The document generator 308 may add a clickable link to the second document 120 corresponding to the hyperlink in the first document 108. The clickable link within the second document 120 may contain the network address of the server system 106. In a manner similar to the search list described above, the hyperlink first directs the web page request to the server system 106, where the server system 106 will retrieve the web page and forward it to the remote device 104 after processing the web page. For example, the first document 108 may contain the following hyperlink to another document at the second remote web server 310:

http://www.secondwebserver.com/another_document.html.

The document generator 308 modifies the hyperlink so that it is first directed to the server system 106, such as in the following URL:

http://www.google.com/?u=www.secondwebserver.com/another_document.html.

In some implementations, a web page element containing the markup link 126 may be in the form of an advertisement banner image. The advertisement banner may have an associated ILE, for example, that determines a particular advertisement from a list of advertisements to display. Here, a unique identifier 312 may be included in the markup link to indicate that the server system 106 provided access to the advertisement banner. Alternatively, the unique identifier 312 may be in another form, such as an HTML "id" attribute. The unique identifier 312 may be added to the markup link 126 indicating the HTML element selected on the second document 120. For example, the unique identifier 312 may be passed to the server system 106 when the markup link 126 is selected by a user. In this implementation, the unique identifiers can be used to track user actions when visiting a web site.

Figure 4:
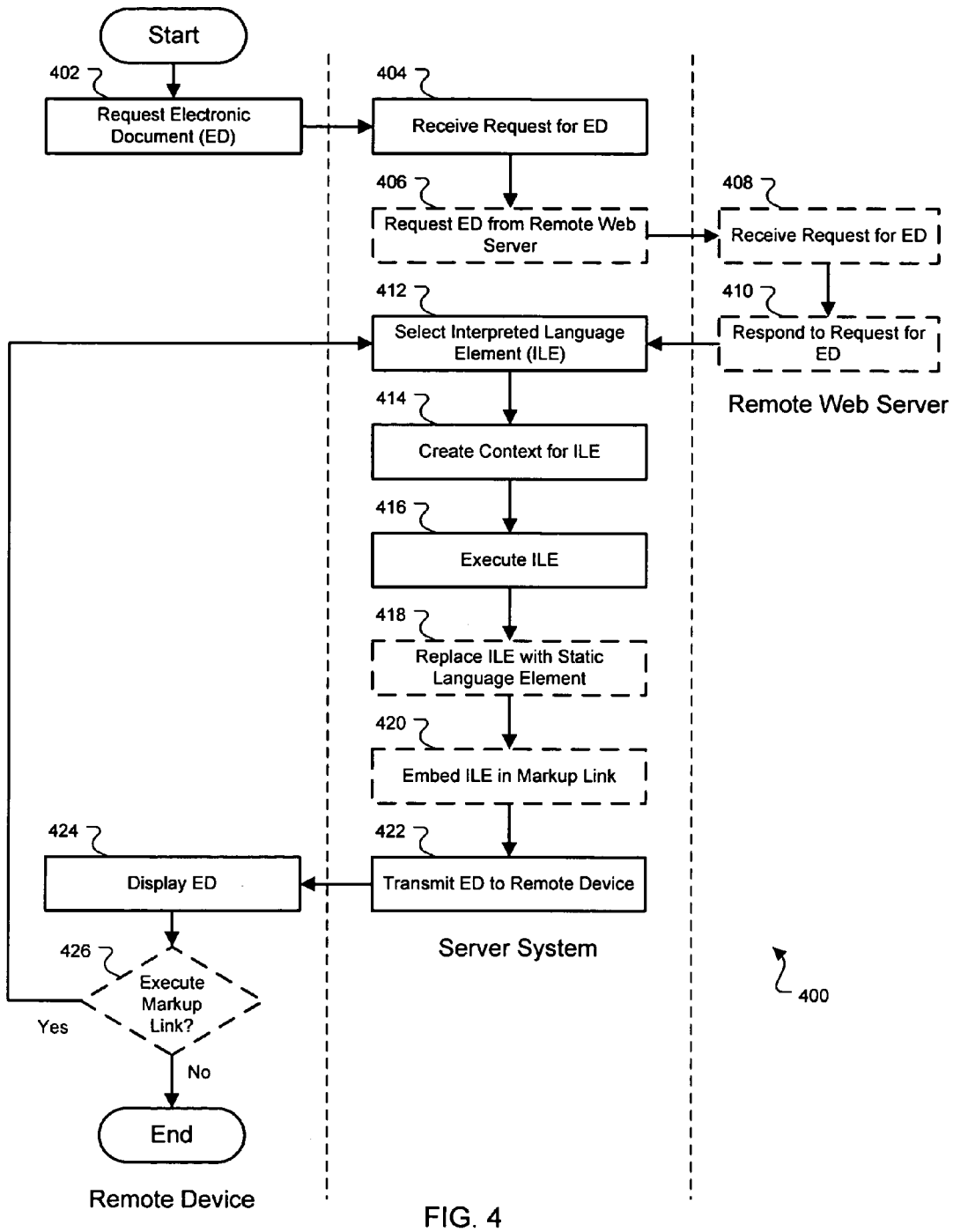
FIG. 4 is a flow chart of exemplary operations that can be performed when processing an ILE for display on a mobile communication device.

FIG. 4 is a flow chart of exemplary operations that can be performed when processing an ILE to be executed on a mobile communication device. For example, the operations 400 can be performed in the server system 106. A processor executing instructions stored in a computer program product can perform the operations 400. The operations 400 begin in step 402 with a request from a remote device for a first electronic document, such as a mobile communication device. For example, the user of the remote device 104 may send the request to the server system 106 for the first document 108.

In step 404, a server system receives the request for the first document from the remote device. For example, the server system 106 may receive the request for the first document 108 from the remote device.

In optional step 406, the server system may make a request to a remote web server for the first document. In optional steps 408 and 410, the remote web server may receive the request for the first document and send a response including the first document to the server system, respectively. For example, the server system 106 may request from the remote web server 112 the first document 108 and the remote web server 112 may send a response including the first document 108.

In step 412, the server system selects an interpreted language element from the first document. For example, the server system 106 includes the parser 304, which is capable of parsing the first document 108 to locate the ILE 102.

In step 414, the server system creates a context for the ILE. For example, the parser 304 loads the first document 108 into a DOM tree creating the context 305A consisting of HTML elements. The context 305A may be stored in the context repository 305B for future access by actions in the ILE 102.

In step 416, an interpreter in the server system executes the ILE. For example, the interpreter 306 executes actions in the ILE 102 using the context 305A.

In optional step 418, the server system may replace the ILE with a static language element. For example, the document generator 308 may replace the ILE 102 in the first document 108 with the static language element 122 based on the results of executing the ILE 102.

In optional step 420, the server system embeds the ILE in a markup link that contains an address of the server system. For example, in FIG. 7A the document generator 308 generates the second document 120 including the markup link 126 that contains the address 128 and the embedded ILE 130.

In step 422, the server system transmits the second document to the remote device. For example, the server system 106 may transmit the second document 120 to the remote device 104 over the network 358 using the interface 352.

In step 424, the remote device displays the second document. The second document may contain one or more markup links. In optional step 426, if the user does not select the markup link the operations 400 terminate. Otherwise, if the user selects a markup link, the operations 400 return to step 412, where the ILE stored in the context may be executed again or an ILE embedded in the markup link may be executed using the stored context. A third electronic document may then be sent to the remote device based on the results from the execution of the ILE or the embedded ILE. The following figures illustrate an example where a markup link executed by the user initiates the generation of a third document at the server system.

Figure 5:
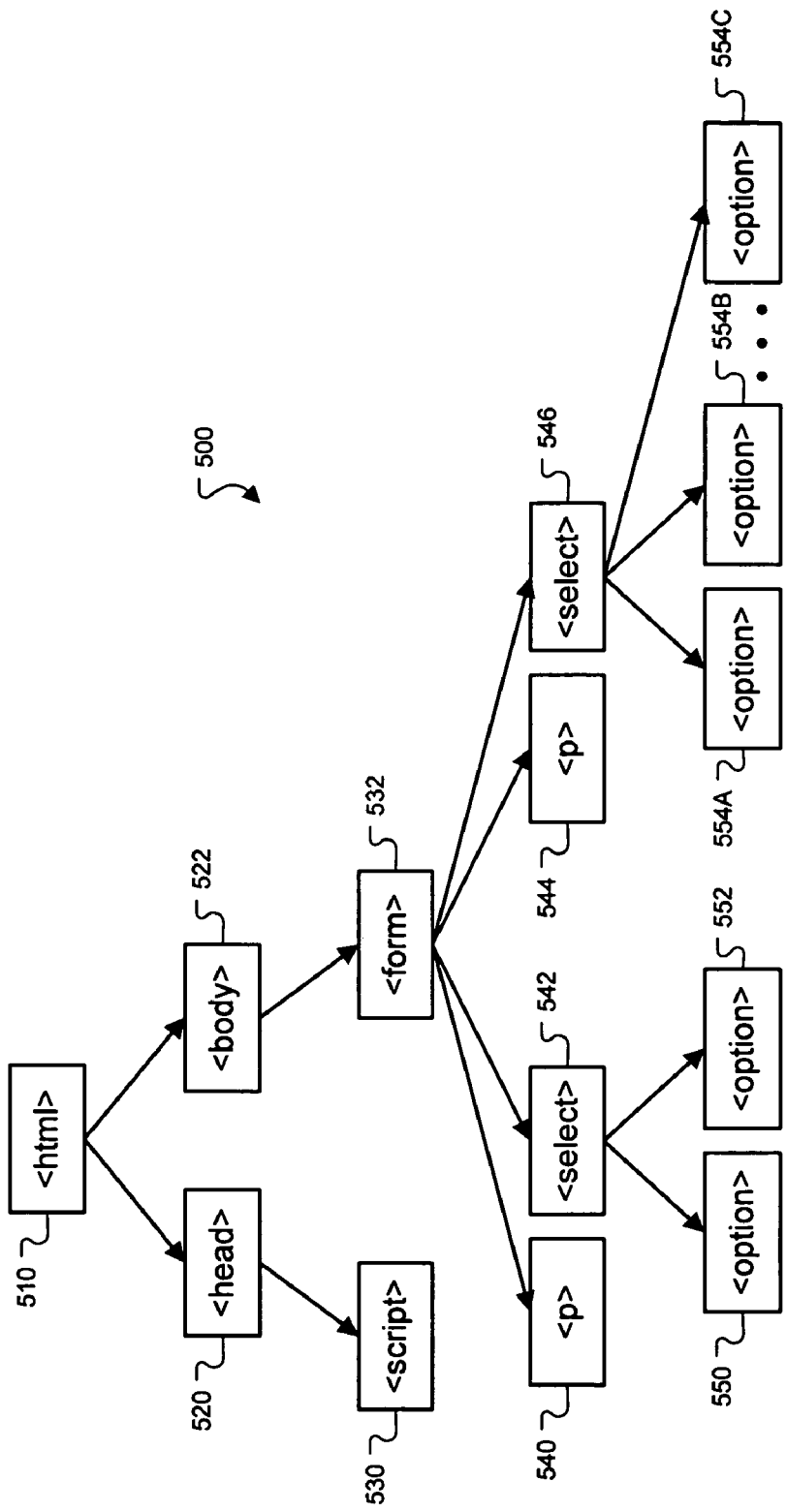
FIG. 5 is an exemplary document object model (DOM) tree of a web page including an ILE.

FIG. 5 is an exemplary document object model (DOM) tree of a web page including an ILE. FIG. 5 shows an exemplary DOM tree 500 for the first document 108. In one implementation, the first document 108 is in an HTML format. Each HTML tag in the first document 108 may be represented by a node in the tree 500. In some implementations, the parser 304 parses the first document 108 into the DOM tree 500 and traverses the tree 500 to locate the ILE 102.

In the example of FIG. 5, the DOM tree 500 contains an <html> node 510, a <head> node 520, and a <body> node 522 representing an <html> tag, a <head> tag, and a <body> tag, respectively, in the first document 108. The <head> node 520 has a child <script> node 530 and the <body> node 522 has a child <form> node 532. The <script> node 530, corresponding to the ILE 102 of FIG. 1, may specify actions to be performed when the user makes an input in the <form> node 532.

The <form> node 532 has a first <paragraph> (<p>) node 540 that may include text, such as, "Choose a food category:," describing a first <select> input node 542. The <form> node 532 also has a second <p> node 544 that may include text, such as, "Choose a specific food item:," describing a second <select> input node 546. The first <select> node 542 has a first child <option> node 550 and a second child <option> node 552. The second <select> node 546 also has several <option> nodes 554A-C.

The <script> node 530 may include data entry validation actions. The actions may restrict the <option> nodes 554A-C available to the user in the second <select> node 546 based on the user's selection in the first <select> node 542.

For example, the <option> node 550 may correspond to a "Fruits" selection and the <option> node 552 may correspond to a "Vegetables" selection that the user can make in the <select> node 542. Selecting the Fruits <option> node 550 may cause the actions specified in the <script> node 530 to change the available selections in the <option> nodes 554A-C to "Apple," "Banana," "Grape," "Kiwi," and "Orange." Accordingly, selecting the Vegetables <option> node 552 may cause the actions specified in the <script> node 530 to change the available selections in the <option> nodes 554A-C to "Carrot," "Cucumber," "Lettuce," "Spinach," and "Tomato."

Figures 6A, 6B:
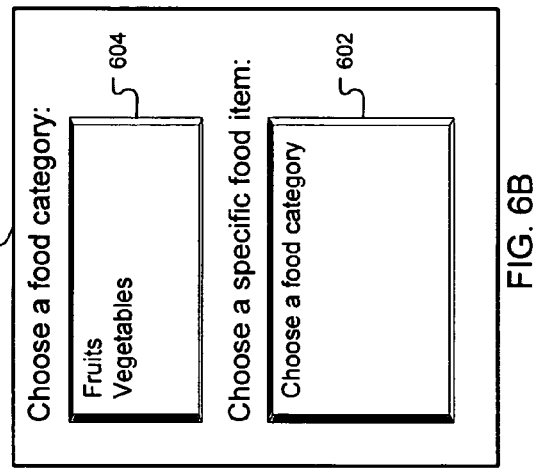
FIG. 6A is a schematic diagram of a first document showing HTML code including an ILE.
FIG. 6B shows a web page generated by the HTML code of FIG. 6A.

FIG. 6A is a schematic diagram of a first document showing HTML code including an ILE. The first document 108 of FIG. 6A shows an example of HTML code contained in a web page that could be represented using the DOM tree 500 of FIG. 5. The ILE 102 of FIG. 6A is specified by an HTML <script> tag and uses JavaScript functions to dynamically create and remove <option> tags within a second <select> tag 602 based on the <option> tag selected in a first <select> tag 604 by the user.

FIG. 6B shows a web page generated by the HTML code of FIG. 6A. FIG. 6B shows the first document 108 of FIG. 6A as it would appear, prior to server system 106 processing, in a browser that supports the script in the ILE 102. The web page contains the first input selection control 604 and the second input selection control 602. Currently, the user has not selected an option in the first input selection control 604. Consequently, the second input selection control 602 shows a default option. Were the user to select an option in the first control 604, the second control 602 would populate with a list of options corresponding to either fruits or vegetables based on the option selected in the first control 604.

Figure 7B:
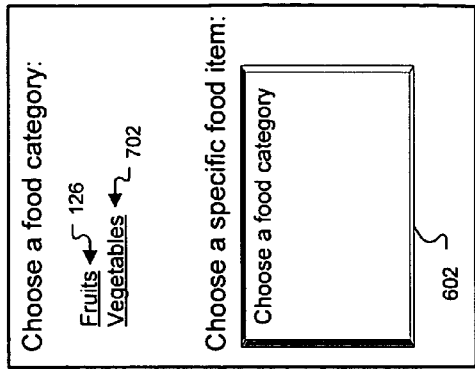
FIG. 7B shows a web page generated by the HTML code of FIG. 7A.
Figure 7D:
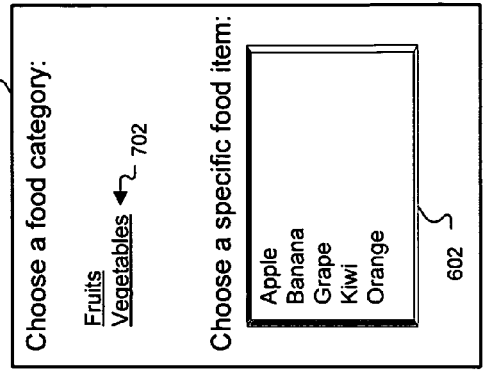
FIG. 7D shows a web page generated by the HTML code of FIG. 7C.
Figure 7A:
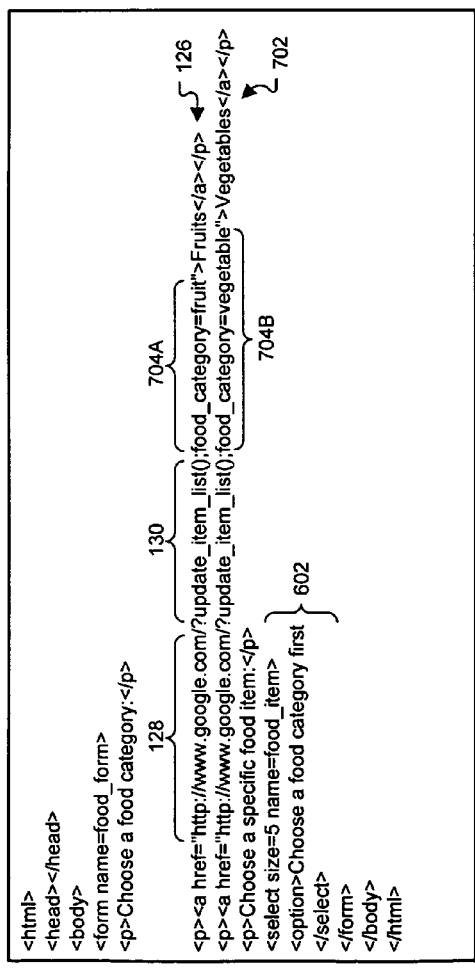
FIG. 7A is a schematic diagram of a second document showing HTML code after processing by the system of FIG. 1.

FIG. 7A is a schematic diagram of a second document showing HTML code after processing by the system of FIG. 1. The server system 106 processed the first document 108 of FIG. 6A to produce the second document 120 of FIG. 7A. In this example, the second document 120 does not contain the ILE 102. Also, as shown in FIG. 6A, the actions in the ILE 102 depend on user interaction with the selection control 604. In order to communicate the user interaction back to the server system 106, where the ILEs can be executed, the selection control 604 has been replaced by markup links, including the markup link 126 and a second markup link 702. The markup links contain the address 128 of the server system 106 and the embedded ILE 130. The address 128 directs the user interaction to the server system 106.

The server system 106 may use unique identifiers 704A,B to determine which option has been selected in the markup links that replaced the selection control 604. The context 305A may be updated based on the option selected by the user. The server system 106 then extracts and executes the embedded ILE 130. During execution, the context 305A may be needed to complete the processing of the ILE 102. Additionally, executing the ILE 102 may produce additional or modified elements, which may add to or replace existing elements in the context 305A.

FIG. 7B shows a web page generated by the HTML code of FIG. 7A. The second document 120 of FIG. 7B shows an example of the generated web page as displayed on the remote device 104. The markup link 126 and the markup link 702 replace the selection control 604 of FIG. 6B. The selection control 602 has a default value indicating that the user has not yet selected a food category. If the user selects the Fruits markup link 126, the selection control 602 may be populated with a list of fruits.

Figure 7C:
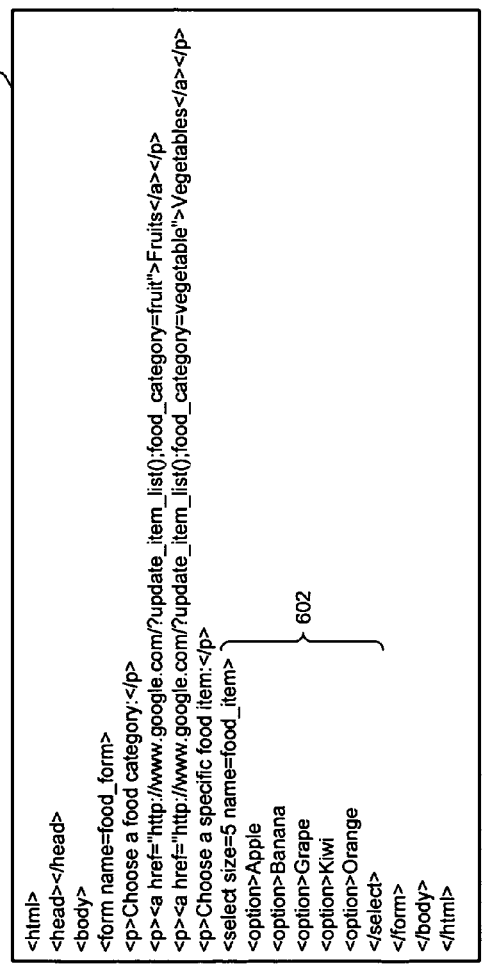
FIG. 7C is a schematic diagram of a third document showing HTML code after further processing by the system of FIG. 1.

FIG. 7C is a schematic diagram of a third document 706 showing HTML code after further processing by the system of FIG. 1. In FIG. 7C the user has selected the markup link 126 of FIG. 7B. The server system 106 has updated the context 305A using the information in the unique identifier 704A and executed the embedded ILE 130 using previously stored context relating to the options available under Fruits. The server system 106 has generated the HTML code shown in the third electronic document 706 of FIG. 7C using the results of executing the embedded ILE 130. Here, the embedded ILE 130 has replaced the default option in the selection control 602 with a list of fruits including "Apple," "Banana," "Grape," "Kiwi," and "Orange."

FIG. 7D shows a web page generated by the HTML code of FIG. 7C. The third document 706 of FIG. 7D shows an example of the generated web page as displayed on the remote device 104. The selection control 602 now displays the list of fruits including "Apple," "Banana," "Grape," "Kiwi," and "Orange." The user may make further interactions in the web page that are directed to the server system 106 for processing. For example, the user may select the Vegetables markup link 702, which may result in the server system 106 generating a fourth document and transmitting the fourth document to the remote device 104, the fourth document including a list of vegetables in the selection control 602.

Figure 8:
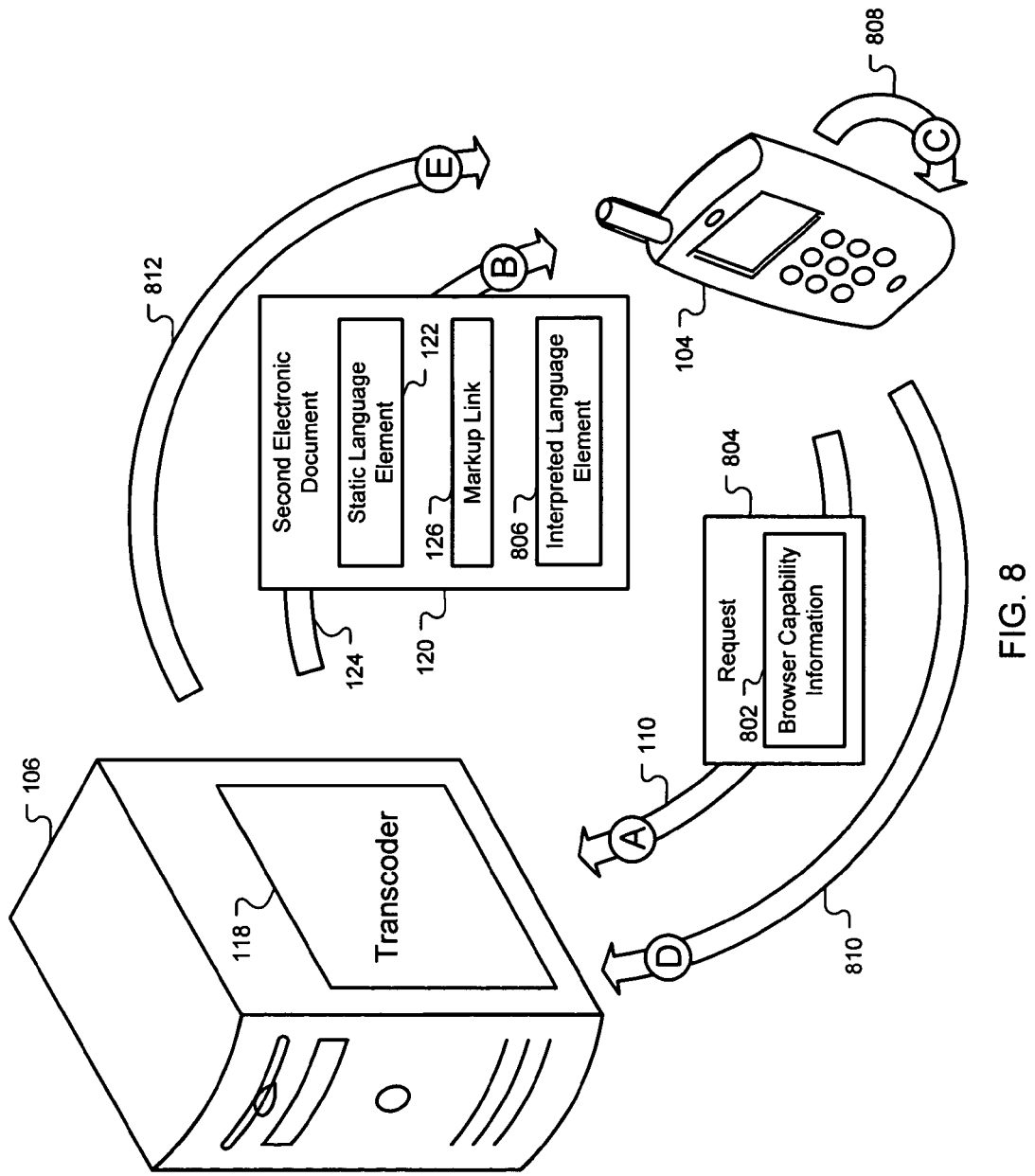
FIG. 8 is a schematic diagram of a system where the ILE is partially executed on a mobile communication device.

FIG. 8 is a schematic diagram of a system where the ILE is partially executed on a mobile communication device. The server system 106 and the mobile communication device, hereafter referred to as the remote device 104, perform several actions during the partial execution of the ILE 102. The arrows in FIG. 8 are labeled A through E to indicate the order of the actions according to one implementation. The actions associated with the arrows will be described in more detail below.

In some implementations, the ILE 102 may be partially executed on the remote device 104. For example, the remote device 104 may have support for interpretation of particular actions in the ILE 102. The remote device 104 may include browser capability information 802 in a request 804 to the server system 106 for the first document 108. The browser capability information 802 may indicate to the server system 106 which actions, specified by the ILE 102, the remote device 104 is capable of executing. The transcoder 118 processes the first document 108 and generates the second document 120. The second document 120 may include the static language element 122 and the markup link 126. The second document 120 may also include a second ILE 806, where a portion of the second ILE 806 may be executed at the remote device 104. This execution is as represented by arrow 808 in FIG. 8.

For example, the remote device 104 may be capable of executing the JavaScript document.write( ) function. In this example, the server system 106 may include an action, such as the ILE 102 of FIG. 2 including "document.write ('<p>Hello World!</p>')," in the second document 120 to be executed on the remote device 104. However, the server system 106 may continue to process other actions, such as the ILE 102 of FIG. 6A.

In some implementations, the second ILE 806 may contain actions that the remote device 104 is unable to execute. The remote device 104 may send a request, as represented by arrow 810, to the server system 106 to execute the actions that the remote device 104 was unable to perform. The server system 106 may then send another document, as represented by arrow 812, including any changes resulting from executing the actions that the remote device 104 indicated it was unable to execute. In one implementation, the remote device 104 sends each request for execution of an action as actions are encountered that it is unable to execute. In another implementation, the remote device 104 sends all of the actions it is unable to execute in one request to the server system 106.

Figure 9:
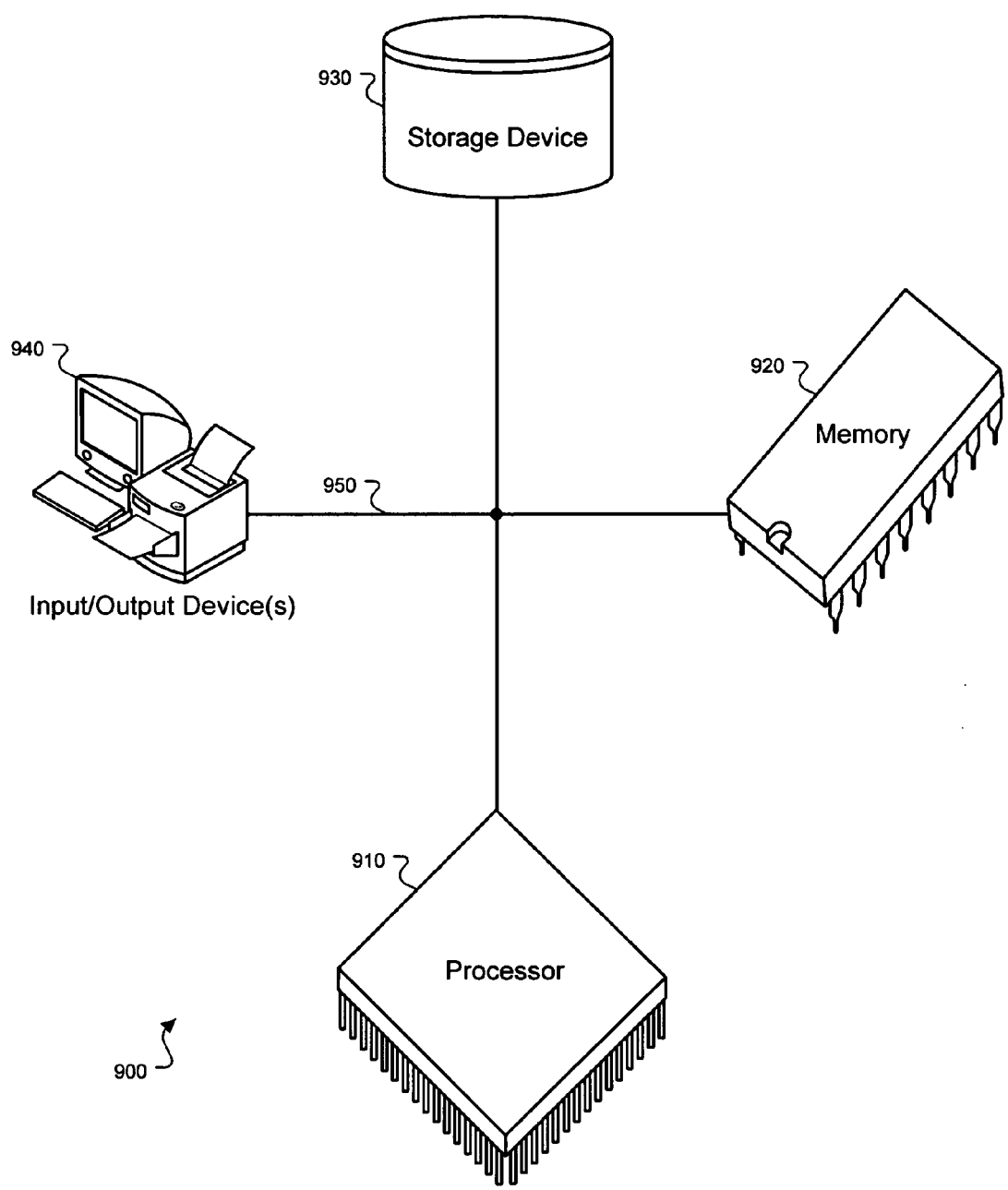
FIG. 9 is a schematic diagram of a generic computer system.

FIG. 9 is a schematic diagram of a generic computer system. The system 900 can be used in the operations 400 described above, according to one implementation. For example, the system 900 may be included in either or all of the server system 106, the remote device 104, the remote web server 112, and the second remote web server 310.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Portions of this disclosure discuss the electronic documents including HTML, but any number of formats may be processed by the described system including XML (Extensible Markup Language), WML (Wireless Markup Language), PDF (Portable Document Format), word processing formats, and image formats. Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

What is claimed is:

1. A computer-implemented method of processing an interpreted language element for execution on a mobile communication device, comprising:
   receiving at a computer server system a request from a remote computing device for a first electronic document that comprises an interpreted language element and information content,
   wherein the interpreted language element comprises code that can be executed on a client device and that, when executed on the client device, causes content to be dynamically generated and displayed as part of the first electronic document, and
   wherein the interpreted language element includes a first portion that, when executed, generates first content, and a second portion that is executed in response to user input and that generates second content;
   executing, by the computer server system, the first portion of the interpreted language element to generate a static representation of the first content and a selectable link that, selection of which, represents the user input;
   creating with the computer server system a context for the interpreted language element;
   generating, by the computer server system, a second electronic document based on a result of the execution, wherein the second electronic document contains the information content, the static representation of the first content, and the selectable link;
   transmitting the second electronic document to the remote computing device for display;
   receiving from the remote computing device an indication of a user selection of the selectable link that represents the user input;
   executing, by the computer server system, the second portion of the interpreted language element in response to receiving the indication that represents the user input to generate a static representation of the second content;
   generating a third electronic document that contains the static representation of the second content and content from the second document, wherein the selectable link in the second document is replaced by the static representation of the second content;
   and transmitting the third electronic document to the remote computing device.

2. The method of claim 1, wherein executing the interpreted language element comprises performing an action specified by the interpreted language element.

3. The method of claim 1, wherein executing the interpreted language element comprises embedding the second portion of the interpreted language element in the selectable link.

4. The method of claim 1, wherein generating the second electronic document comprises modifying the first electronic document by replacing the interpreted language element with a static language element that includes the static representation of the first content and the selectable link.

5. The method of claim 4, wherein the static language element comprises a unique identifier.

6. The method of claim 1, wherein the selectable link includes an address corresponding to the computer server system.

7. The method of claim 1, wherein executing the second portion of the interpreted language element includes executing an action specified by the second portion of the interpreted language element.

8. The method of claim 7, wherein the third electronic document is generated based on results of the execution of the action specified by the second portion of the interpreted language element.

9. The method of claim 7, wherein the context created for the interpreted language element comprises document elements from the first electronic document and wherein the created context is used in the execution of the action specified by the second portion of interpreted language element.

10. The method of claim 1, further wherein the first electronic document comprises more than one frame.

11. The method of claim 1, further comprising retrieving the requested first electronic document from a remote web server.

12. The method of claim 1, further comprising parsing contents of the first electronic document into a document object model tree and traversing the tree to locate a the interpreted language element.

13. The method of claim 12, wherein the context comprises document objects that form nodes of the document object model tree.

14. The method of claim 1, further comprising transmitting a second interpreted language element in the second electronic document for execution on a client.

15. The method of claim 14, further comprising receiving a request from the client to execute a portion of the second interpreted language element.

16. The method of claim 1, wherein the interpreted language element is selected from a group consisting of a JavaScript element, a Visual Basic Script element, a Perl element, and a Tool Command Language element.

17. The method of claim 1, wherein the static language element is selected from a group consisting of a Hyper Text Markup Language element, an Extensible Markup Language element, and a Wireless Markup Language element.

18. The method of claim 1, further comprising storing in a database the second electronic document and transmitting the stored second electronic document in response to future requests for the first electronic document.

19. The method of claim 1, wherein executing the interpreted language element occurs after the request is received from the remote device.

20. The computer-implemented method of claim 1, wherein executing the second portion of the interpreted language element comprises executing instructions that are part of the code comprising the second portion of the interpreted language element, and wherein execution of the instructions that are part of the code comprising the second portion of the interpreted language element causes the computer server system to generate the static representation of the second content.

21. The computer-implemented method of claim 1, wherein the code comprising the interpreted language element defines one or more programming functions that, upon execution, cause content to be dynamically generated as output of the one or more programming functions.

22. The computer-implemented method of claim 1, wherein the code comprising the interpreted language element includes one or more instructions that, when executed by a computing device, cause the computing device to dynamically generate content based on user input.

23. The computer-implemented method of claim 1, wherein the interpreted language element comprises JavaScript code.

24. A computer-implemented system for processing an interpreted language element for execution on a mobile communication device, comprising:
   one or more computer processors to operate a parser to select an interpreted language element from a first electronic document that also contains information content, wherein the interpreted language element comprises code that can be executed on a client device and that, when executed on the client device, causes content to be dynamically generated and displayed as part of the first electronic document, and
      wherein the interpreted language element includes a first portion that, when executed, generates first content, and a second portion that is executed in response to user input and that generates second content;
   means for executing the first portion of the interpreted language element to generate a static representation of the first content; for generating a selectable link that, user selection of which, represents the user input; and for generating a second electronic document that includes the information content, the static representation of the first content, and the selectable link;
   means for receiving an indication of a user selection of the selectable link that represents the user input; for executing the second portion of the interpreted language element in response to receiving the indication that represents the user input to generate a static representation of the second content; and for generating a third electronic document that contains the static representation of the second content and content from the second document, wherein the selectable link in the second document is replaced by the static representation of the second content; and
   an interface operable on the one or more computer processors to transmit the second electronic document and the third electronic document to a remote device.

25. A system for processing an interpreted language element for providing content on a mobile communication device, comprising:
   one or more computer processors to operate a parser to organize elements in a first electronic document and to select an interpreted language element from the organized elements,
      wherein the interpreted language element comprises JavaScript code that, when executed, causes content to be dynamically generated and displayed as part of the first electronic document, and
      wherein the interpreted language element includes a first portion of the JavaScript code that, when executed, generates first content, and a second portion of the JavaScript code that is executed in response to user input and that generates second content;
   an interpreter to:
      execute the first portion of the JavaScript code of the selected interpreted language element to generate a static representation of the first content and to generate a selectable link that, user selection of which, represents the user input, and
      execute the second portion of the JavaScript code of the interpreted language element in response to receiving an indication of a user selection of the selectable link that represent the user input from a remote client to generate a static representation of the second content;
   a context repository stored on a computer system containing at least a portion of the organized elements in a format accessible by the interpreter; and
   a document generator executable on the one or more processors to:
      produce a second electronic document comprising the information content, the static representation of the first content, and the selectable link, and
      produce in response to the user selection of the selectable link in the second electronic document a third document that includes the static representation of the second content and content from the second document, wherein the selectable link in the second document is replaced by the static representation of the second content.

26. A computer implemented method for receiving an electronic document with translated elements, comprising:
   transmitting from a wireless electronic device to a server system a user selection of a web page link retrieved from a web search;
   receiving at the wireless device a first electronic document generated at the server system by:
      accessing a web page that is a target of the web page link, wherein the web page includes an interpreted language element and information content,
      wherein the interpreted language element comprises code that can be executed on a client device and that, when executed on the client device, causes content to be dynamically generated and displayed as part of the web page, and
      wherein the interpreted language element includes a first portion that, when executed, generates first content, and a second portion that is executed in response to user input and that generates second content,
      executing the first portion of the interpreted language element to generate a static representation of the first content and a selectable link that, selection of which, represents the user input,
      creating a context associated with results of the execution, and
      generating the first electronic document based on a result of the execution, wherein the second electronic document contains the information content, the static representation of the first content, and the selectable link;
   receiving a user selection of the selectable link and transmitting to the server system information indicating the user selection; and
   receiving at the wireless device a second electronic document generated at the server system by:
      executing the second portion of the interpreted language element in response to receiving the information indicating the user selection that represents the user input to generate a static representation of the second content, and
      generating the second electronic document that contains the static representation of the second content and content from the second document, wherein the selectable link in the second document is replaced by the static representation of the second content.

27. The method of claim 26, wherein the wireless device is selected from a group consisting of a mobile telephone, a personal digital assistant, a portable computer, and a mobile email device.

* * * * *